US010220517B2

(12) United States Patent
Delazari Binotto et al.

(10) Patent No.: US 10,220,517 B2
(45) Date of Patent: Mar. 5, 2019

(54) SYSTEM, METHOD AND COMPUTER PROGRAM PRODUCT FOR CONTROLLING A MISSION-ORIENTED ROBOT BASED ON A USER'S EMOTIONAL STATE

(71) Applicant: International Business Machines Corporation, Armonk, NY (US)

(72) Inventors: Alecio Pedro Delazari Binotto, São Paulo (BR); Rodrigo Laiola Guimaraes, São Paulo (BR); Davi Francisco Caetano dos Santos, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 45 days.

(21) Appl. No.: 15/339,201

(22) Filed: Oct. 31, 2016

(65) Prior Publication Data

US 2018/0117769 A1    May 3, 2018

(51) Int. Cl.
*B25J 9/16* (2006.01)
*B25J 11/00* (2006.01)
*G05B 19/042* (2006.01)

(52) U.S. Cl.
CPC .......... *B25J 9/1694* (2013.01); *B25J 11/001* (2013.01); *G05B 19/042* (2013.01); *G05B 2219/45098* (2013.01)

(58) Field of Classification Search
CPC ...... B25J 9/1694; B25J 11/005; B25J 11/001; G05B 19/048; G05B 2219/39371; G05B 2219/39254; G05B 2219/33056; G05B 2219/40414; G05B 2219/40202; G05B 2219/3544; Y10S 901/01
See application file for complete search history.

(56) References Cited

U.S. PATENT DOCUMENTS

| | | | | |
|---|---|---|---|---|
| 9,459,620 B1* | 10/2016 | Schaffalitzky | ....... | G05D 1/0016 |
| 2013/0103195 A1* | 4/2013 | Anhalt | ..... | B25J 9/163 |
| | | | | 700/248 |
| 2017/0113353 A1* | 4/2017 | Monceaux | ........... | G10L 13/027 |
| 2017/0125008 A1* | 5/2017 | Maisonnier | ........... | B25J 11/003 |
| 2017/0297201 A1* | 10/2017 | Shionozaki | ........... | B25J 9/1694 |
| 2018/0081365 A1* | 3/2018 | Asukai | ................ | G05D 1/0212 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Dale Moyer
(74) *Attorney, Agent, or Firm* — Louis J. Percell, Esq.; McGinn IP Law Group, PLLC

(57) ABSTRACT

A robot control method, system, and computer program product, include extracting robot data from the robot and user emotional state data of a user interacting with the robot, configuring a mission of a robot comprising a sequence of a plurality of tasks based on the robot data and the user emotional state data, and reconfiguring an order of the sequence of the plurality of tasks if a change in the user emotional state data is detected.

20 Claims, 7 Drawing Sheets

ROBOT CONTROL METHOD 100

ROBOT CONTROL METHOD 100

SYSTEM, METHOD AND COMPUTER PROGRAM PRODUCT FOR CONTROLLING A MISSION-ORIENTED ROBOT BASED ON A USER'S EMOTIONAL STATE

BACKGROUND

The present invention relates generally to a robot control method, and more particularly, but not by way of limitation, to a system, method, and computer program product for dynamically changing a robot's mission (e.g., by reconfiguring its sequence of actions) based on an interaction with a user and assessment of the user's emotional state.

Autonomous robots perform tasks without being controlled by humans. As such, robots often need to cope with chaotic and unpredictable variables to gain information about the environment and then operate. The robots are particularly desirable in dirty, dangerous, inaccessible or boring tasks (e.g., volcano exploration, domestic cleaning, deliveries to hotels rooms, warehouses operations, military/assault operations, workplace safety, disaster/survival situation, among others). In particular, domestic robots are simple robots dedicated to a single task (or mission) in home use. They are used in simple but unwanted jobs, such as vacuum cleaning, floor washing, and lawn mowing.

Conventionally, robot owners can only 'tell' cleaning robots when to start/stop, but not how the robots should perform a given mission. That is, when users share the environment with active robots, the users may face undesirable or strange situations and have no clue of the robots' rationale behind an ongoing action. In other words, although the robots' sequence of actions to achieve a high-level goal or mission (e.g., clean the house) might be correct, the robot's actions may be interpreted as unintelligent (e.g., the robot visiting the same room several times instead of only giving it one pass) from the user's perspective. This scenario can have direct impact not only in users' emotional state (e.g., mood, patience), but also in the human-robot relationship and brand trust.

Conventional solutions do not consider users' emotional data in the process to dynamically change or adapt a given mission or to generate the most suitable explanation about actions/tasks of an autonomous mission-oriented robot.

SUMMARY

In an exemplary embodiment, the present invention can provide a computer-implemented robot control method, the method including extracting robot data from the robot and user emotional state data of a user interacting with the robot, configuring a mission of a robot comprising a sequence of a plurality of tasks based on the robot data and the user emotional state data, and reconfiguring an order of the sequence of the plurality of tasks if a change in the user emotional state data is detected.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
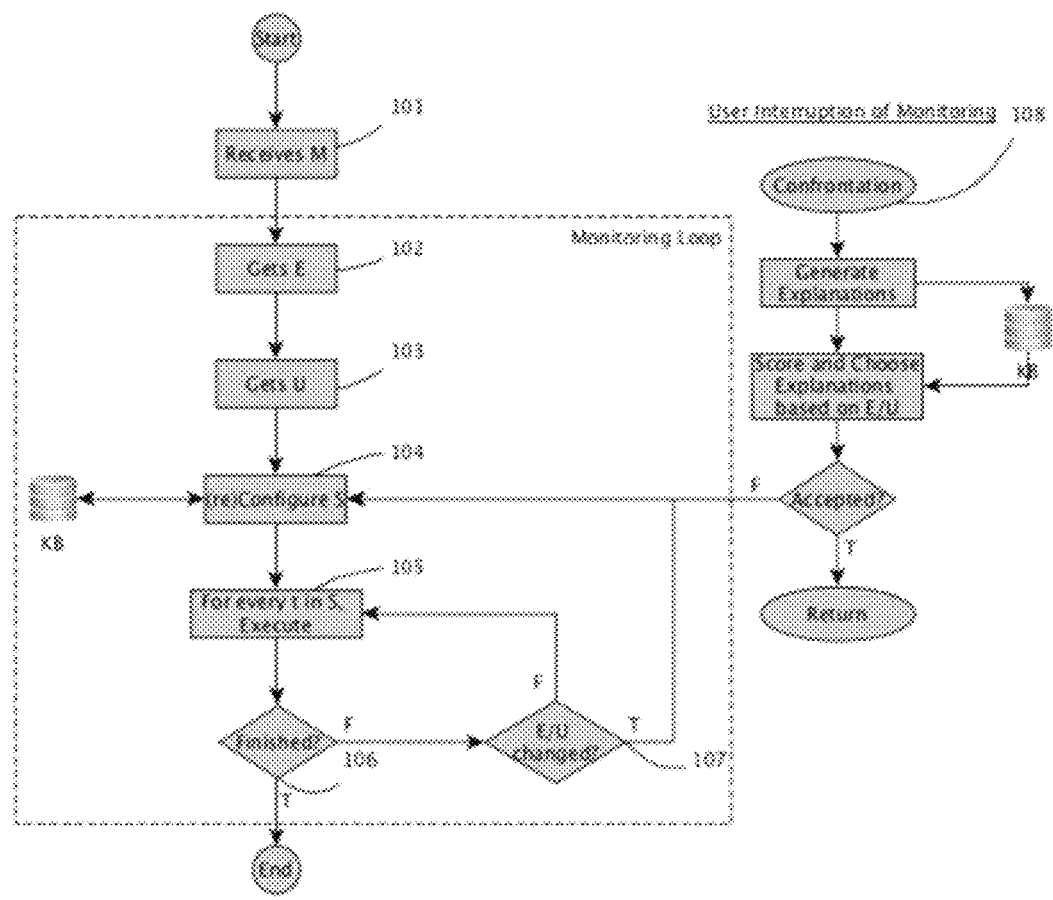
FIG. 1 exemplarily shows a high-level flow chart for a robot control method 100.

The invention will now be described with reference to FIGS. 1-7, in which like reference numerals refer to like parts throughout. It is emphasized that, according to common practice, the various features of the drawings are not necessarily to scale. On the contrary, the dimensions of the various features can be arbitrarily expanded or reduced for clarity.

With reference now to the example depicted in FIG. 1, the robot control method 100 includes various steps to analysis and consider a users' emotional state (and environment) in a process to dynamically (re)arrange and explain the sequence of actions to accomplish a given mission. As shown in at least FIG. 5, one or more computers of a computer system 12 according to an embodiment of the present invention can include a memory 28 having instructions stored in a storage system to perform the steps of FIG. 1.

Thus, the robot control method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 5-7) may be implemented in a cloud environment 50 (see e.g., FIG. 6), it is nonetheless understood that the present invention can be implemented outside of the cloud environment. Embodiments of the cognitive system can be configured as a stand-alone system that is sensitive not only to the requirements, constraints, and uncertainty of the environment, but also to users' emotional state (e.g., humor, mood, patience, openness, stress levels, etc.). Alternatively, the cognitive system may be integrated into other systems such as IBM Watson or devices such as iRobot Roomba, Aethon TUG Robot, Savioke, Locus Robotics robot. This integration supports and aims at enhancing aspects such as users' impression about the robot, users' well-being, increase likeness, avoid confrontation, enhance human-robot relationship, enhance human decision making and brand/robot trust."

Figure 2:
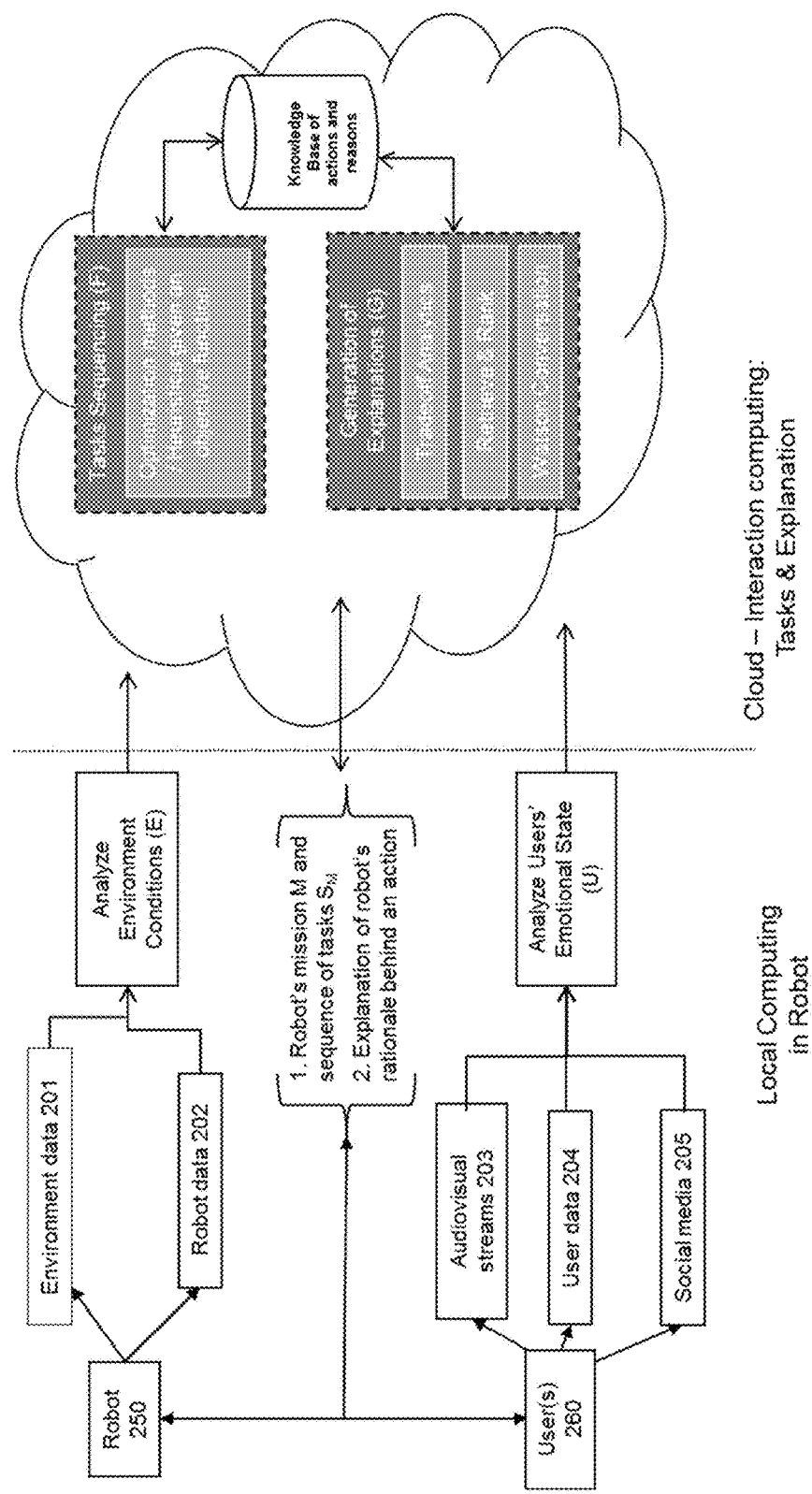
FIG. 2 exemplarily depicts a high-level system architecture for a system 200 that can execute the method 100.

Referring now to FIGS. 1 and 2, the embodiments described herein provide a cognitive system and method for robots that are sensitive not only to the requirements, constraints, and uncertainty of the environment, but also to users' emotional state (e.g., humor, mood, patience, openness, stress levels, etc.). The method and system can provide a tradeoff analysis that considers users' emotional state (or even well-being data) to dynamically change or adapt a given mission, a tradeoff analysis to consider users' emotional state (or even well-being data) in a process to generate explanations about the actions of mission-oriented robots, and a knowledge base with a history of changes, explanations and feedback to personalize future interactions based on users' emotional state.

The method 100 and system 200 can provide a semi-autonomous system that is realized into a mechanical device (e.g., robot, unmanned drone, etc.) in which users may specify a high-level goal or mission. Moreover, the method 100 and system 200 is sensitive not only to the requirements/constraints/uncertainty of the environment (e.g., door closed/opened, users moving around or a spot that got dirty and it requires a new pass), but also to users' emotional state (e.g., humor, mood, patience, openness, etc.). The emotional information can be considered in the process to dynamically adapt or rearrange the sequence of actions and to provide explanations of the robot's actions (e.g., upon user request).

In step 101, the method 100 starts with a robot receiving a mission "M". A mission (or sequence of tasks) includes a set of pre-defined tasks, which associated to a given location (e.g., vacuum clean the living room, wash bathroom, polish living room etc.).

In step 102, a number of robot parameters ("E") are retrieved and analyzed such as its current power level, mapping of the environment, its current location, position of users at this point in time, historical data about previous operations and any other environment conditions (e.g., pathway to a task in the mission, door open/closed, location of objects, etc.), etc. In other words, environment data 201 and robot data 202 are retrieved from the robot 250. In other words, step 102 retrieves and analyzes information about an area of coverage of the robot (or location mapping), robot's current location, users' position at a certain point in time are given (e.g., based on the robot's own assessment or obtained from a set of devices in an instrumented environment). The robot data can also include mission business data such as costs of adjusting the sequence of tasks, deadlines (e.g., a room in a hotel must be cleaned by a particular time to be ready for a next hotel guest, etc).

In step 103, the users' 260 emotional state ("U") (e.g., mood, patience, openness, excitement, stress levels etc.) is analyzed based on retrieved audio-visual streams 203, user data 204, social media 205, etc. That is, the user's emotional state in relation to the robot can be obtained from the analysis of video, audio and any kind of user sensors data via wearables (heart rate, pulse, mood, galvanic skin response, etc.) or social media.

It is noted that the robot 250 can retrieve the users' emotional state (U) when the robot 250 is in a vicinity of the user.

In step 104, the mission (M), the user's emotional state (U), and the robot parameters (E) can be aggregated either locally or in a cloud computing environment and step 104 computes an initial sequence of tasks for the robot to complete $S_M=(t)$, where each and ever task $t \in M$. For computing the sequence, step 104 may maximize/minimize a given objective function $F(E,U,M,S_M)$ that takes into account the variables of the robot 250 and user(s) 260 from steps 102 and 103, respectively. Other conditions such as social media feeds, the agenda/schedule of users and historical data may be considered in this process. For example, the robots mission M and the sequence of tasks $S_M$ can be optimized given the objective function while simultaneously using data of a knowledge base of actions and reasons.

In step 105, the robot starts and continues executing tasks in $S_M$ one after the other. If there is no task t left in $S_M$, the mission M is accomplished and finished in step 106. The method 100 ends if there is no task t left (condition equals TRUE in step 106).

If there is a task t left in $S_M$ (condition equals FALSE in step 106), in step 107, whenever the environment conditions (E) and/or emotional conditions (U) change during the execution of a given task t (condition equals TRUE in step 107), the sequence $S_M$ is recalculated in step 104 which eventually leads to a new sequence $S_M{'}$. For example, if the robot is performing a loud cleaning task (e.g., vacuuming) and the user is listening to music in the same room, the mood of the user may change to aggravated and the sequence of tasks is rearranged such that the robot performs a different task until the user is done listening to music. That is, the user's emotional state is considered to adjust the sequence of tasks by the robot to increase the user's experience with the robot (e.g., the user is not interrupted by the robots functions).

Figure 3A:
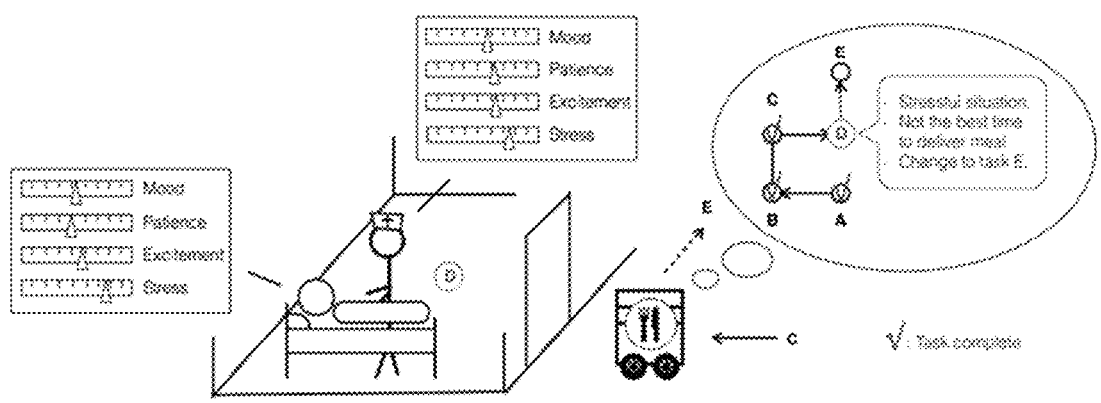
FIG. 3A-B exemplarily depict a reconfiguration of the sequence of tasks performed by the robot based on a change in a user's emotional state (U)
Figure 3B:
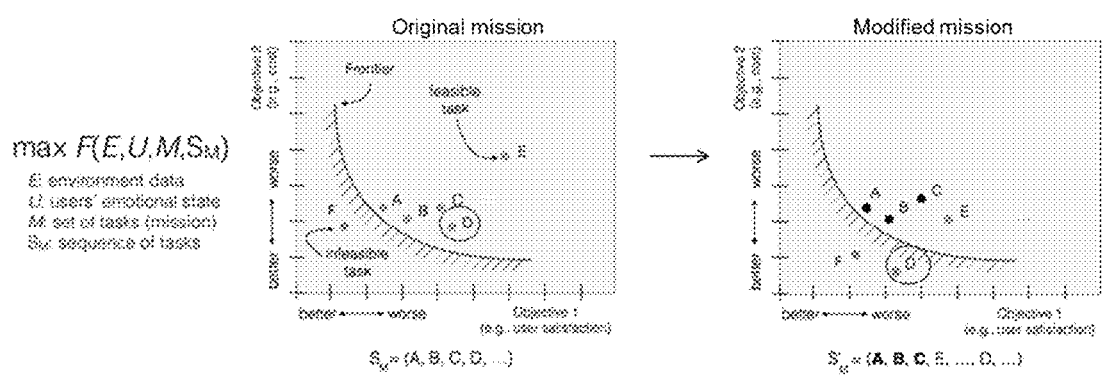

FIGS. 3A and 3B exemplarily depict an emotional state of the user changing to trigger a change in the sequence $S_M$ of tasks t. In FIG. 3A, a nurse is treating a patient. The nurse and the patient each have a high stress level indicating a stressful situation. A food distribution robot has just completed task "C" and task "D" is to deliver food to the patient being treated by the nurse. Because the patient's and nurse's emotional levels (e.g., stress levels increased) has changed since the original configuration of the sequence of tasks (e.g., in step 104), step 107 triggers step 104 to re-calculate the sequence of tasks. As exemplarily shown in FIG. 3B, the original mission has "D" performed before "E" but since the stress level has increased, the modified sequence triggers for task "E" to be performed before task "D". Therefore, because the stressful situation is detected, it is determined that the meal delivery in task "D" is not optimal at that point in time and proceeds to task "E".

Thus, the robot's mission (M) or the sequence of tasks can be dynamically adjusted based on the assessment of users' emotional state.

While the robot is performing a given task tin the sequence $S_M$ (or new sequence $S_M{'}$), step 108 monitors the user interaction with the robot to detect if the user confronts (questions) why the robot is performing a task in the sequence. If a user confronts the robot 250 about a rationale behind the robots current task tin the sequence $S_M$ (e.g., the user asks why the robot is doing a particular task), step 108 generates an explanation detailing why the robot is performing the task by taking into account not only its past actions but also the user emotional state to maximize/minimize a given objective function G(E,U,M,SM) when generating an explanation. The confrontation can be detected via Watson Conversation™ or the like. If the user does not accept the explanation of why a task is being performed, (Accepted? equals FALSE) step 104 may re-configure the sequence of tasks (either upon user's request or automatically) such that the user's enjoyability and emotional state is increased by the robot performing tasks (e.g., in the order) to the user's liking.

Figure 4:
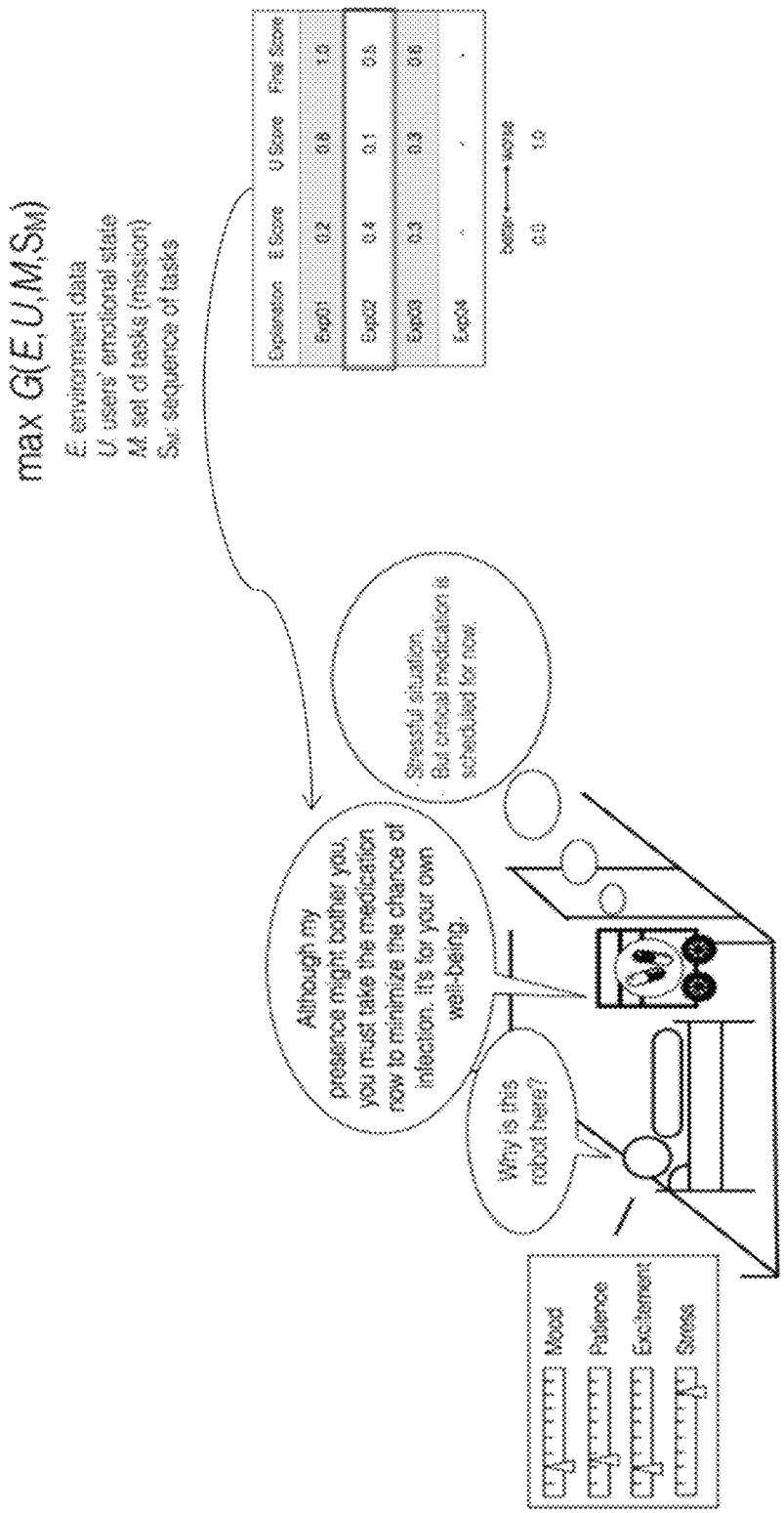
FIG. 4 exemplarily depicts a generation of an explanation by the robot.

FIG. 4 exemplarily depicts a generation of an explanation by the robot 250 in Step 108. A medicine distribution robot enters a patient's room to distribute medicine to the patient as the task in a sequence of tasks. As the robot enters the room (presence of the patient), the robot is confronted by the user with a question "why is the robot here?". Based on the detection of the confrontation with the robot, the robot generates an explanation for the robot's presence from a database of explanations. The explanation considers the user's emotional state (e.g., the user has little patience, a low mood, and high stress) as well as the environment data of the robot. Step 108 maximizes a function of the environment data (E), the user's emotional state (U), the mission (M), and the sequence of tasks ($S_M$) to determine a best explanation to provide to the user. In the example depicted in FIG. 4, step 108 determines the criticality of the distribution of the medicine as an important factor and explains this to the user in the explanation (e.g., "although my presence might bother you, you must take the medication now to minimize the chance of infection, it's for your own wellbeing"). As an example, the "U score" for each of the available explanations (i.e., Exp01, . . . , Exp04) can be modeled as a linear function "U score"=α*(Mood level)+β *(Patience level)+δ *(Excitement level)+ε *(Stress level), where the weights α, β, δ and ε may vary differently over time for each of the explanations. The emotional levels are obtained from monitoring the user. FIG. 4 illustrate the final "U scores". Note that a similar approach could be used for "E scores", where instead of emotional data, the robot would consider data related to the robot and environment. Historical data about previous operations may also be considered. In this same figure, the "Final Score" is basically the sum of the corresponding "E score" and "U score"; and the explanations are ranked from lowest to higher "Final Score" (lowest is better, in the example).

After the explanation is given to the user, user feedback may be used to assess the effectiveness of explanation. The user feedback can be considered to further improve the answer score and ranking algorithm utilized to determine the explanation.

When the user confronts the robot 250, the value/effectiveness of explanations (which can be delivered in different forms e.g., audio, visual etc.) may be evaluated based on the feedback of the user to either continue or reconfigure the sequence of tasks to accomplish M (if possible). In both cases, all related data (environment data "E", users' emotional state data "U", mission "M", and sequence of tasks $S_M$) is stored in its training set and considered in future endeavors. Thereby, an improvement to the users' impression about the robot, users' well-being, increase likeness, avoid confrontation, enhance human-robot relationship, enhance human decision making and brand/robot trust can be achieved.

Therefore, using the mathematical notation, a set of all possible tasks can be denoted as $T=\{t_1, t_2, t_3, \ldots, t_n\}$, where a mission M is a particular subset of T (or T ⊇M), the method 100 and system 200 can receive a mission M (101). A number of parameters of the robot are then retrieved such as its current power level, mapping of the environment, its current location, position of users at this point in time, historical data about previous operations and any other environment conditions (e.g., amount of dirt per location) (102). Complementary, the users' emotional state (e.g., mood, patience, openness, excitement etc.), which can be obtained from the analysis of video, audio and any kind of user sensors data is read and analyzed (103). The users' emotional state and the robot's parameters can be aggregated either locally or in a cloud-computing environment. The robot computes an initial sequence of tasks $S_M=(t_i)$, where $t_i \in M$. For computing such sequence, the robot aims at maximizing/minimizing a given objective function F(E, U,M,$S_M$) that takes into account both environment and emotional variables (104). Note that other conditions such as social media feeds and the agenda/schedule of users may be considered in this process. Subsequently, the robot starts and continues executing tasks in $S_M$ one after the other (105). If there is no task left in $S_M$, the mission M is accomplished (106).

However, whenever the environment or emotional conditions change during the execution of a given task the robot recalculates the sequence $S_M$, which eventually leads to a new sequence $S_M'$ (107). Similarly, if a user confronts the robot about the rationale behind its current task/mission, the robot takes into account not only its past actions but also the user emotional state in the heuristics to generate an explanation (108). As with the dynamic rearrangement of the sequence $S_M$, the generation of explanation may be associated with the maximization/minimization of a given objective function G(E,U,M,$S_M$). Note that the value/effectiveness of explanations (which can be delivered in different forms e.g., audio, visual etc.) may be evaluated based on the feedback of the user to either continue or reconfigure the sequence of tasks to accomplish M. Either way, the robot stores this experience in its training set and consider it in future endeavors.

Although the embodiments described herein refer to the robot detecting the emotional state of the user, the invention is not limited thereto. That is, the method 100 and system 200 can be employed on the robot and the robot detects the emotional state of the user, the method 100 and system 200 can interface with wearables, sensors, video feeds, etc. and a cloud-computing environment to instruct the robot to perform tasks, etc.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail) The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
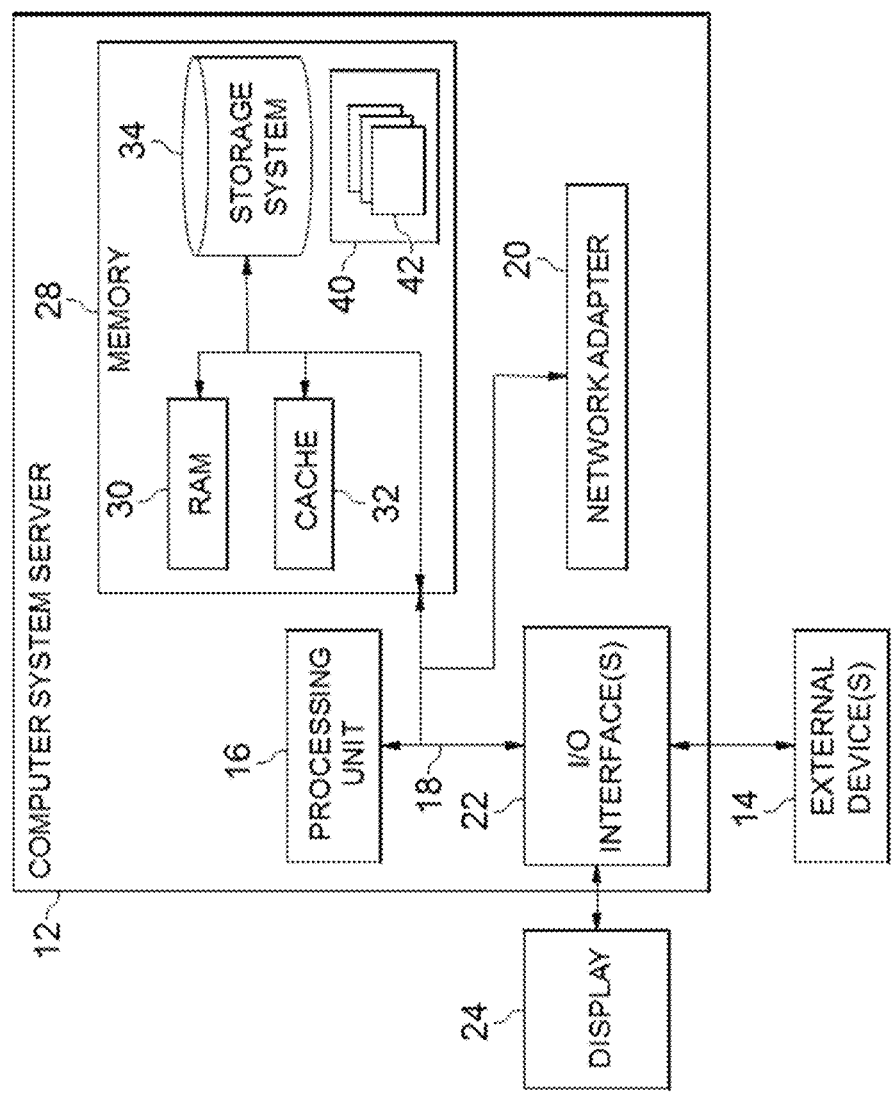
FIG. 5 depicts a cloud computing node 10 according to an embodiment of the present invention.

Referring now to FIG. 5, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 5, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 6:
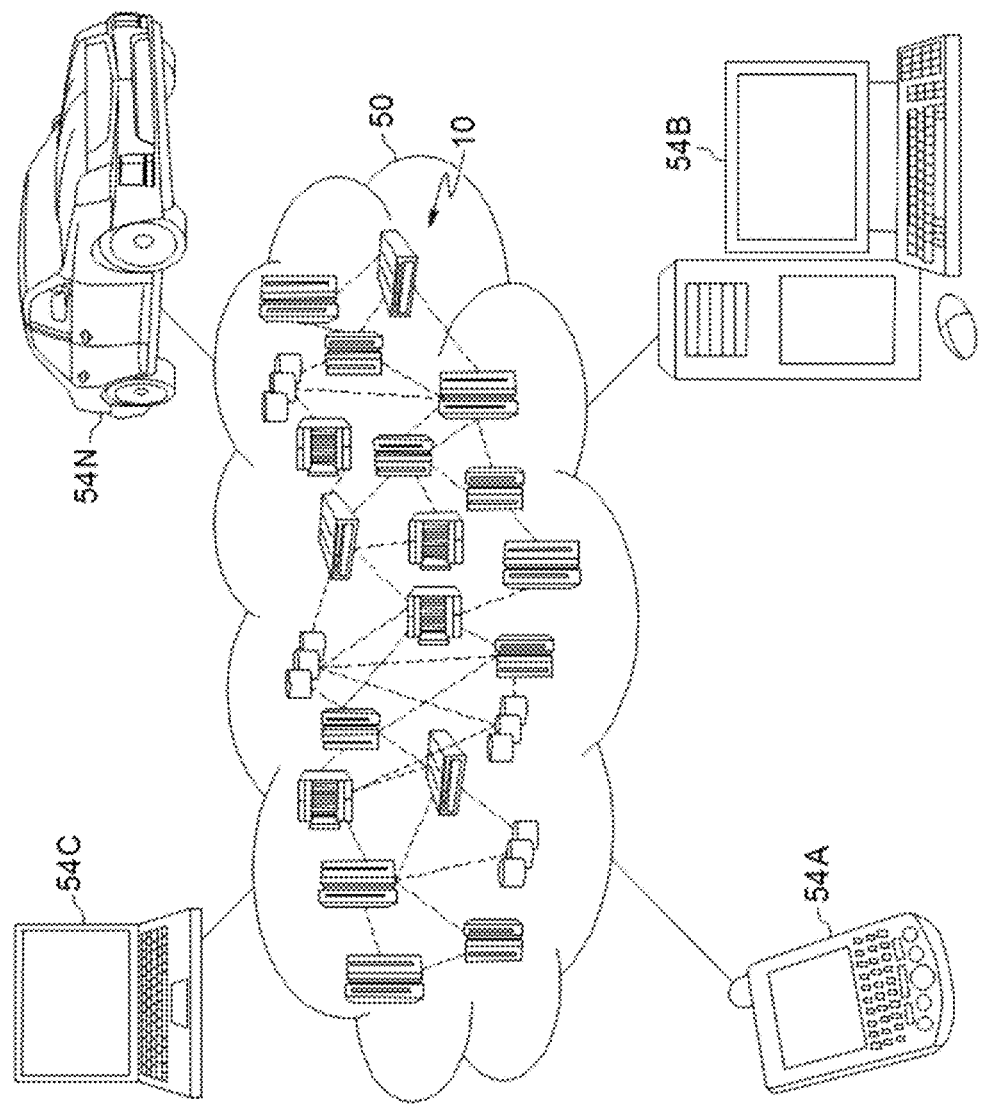
FIG. 6 depicts a cloud computing environment 50 according to an embodiment of the present invention.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Figure 7:
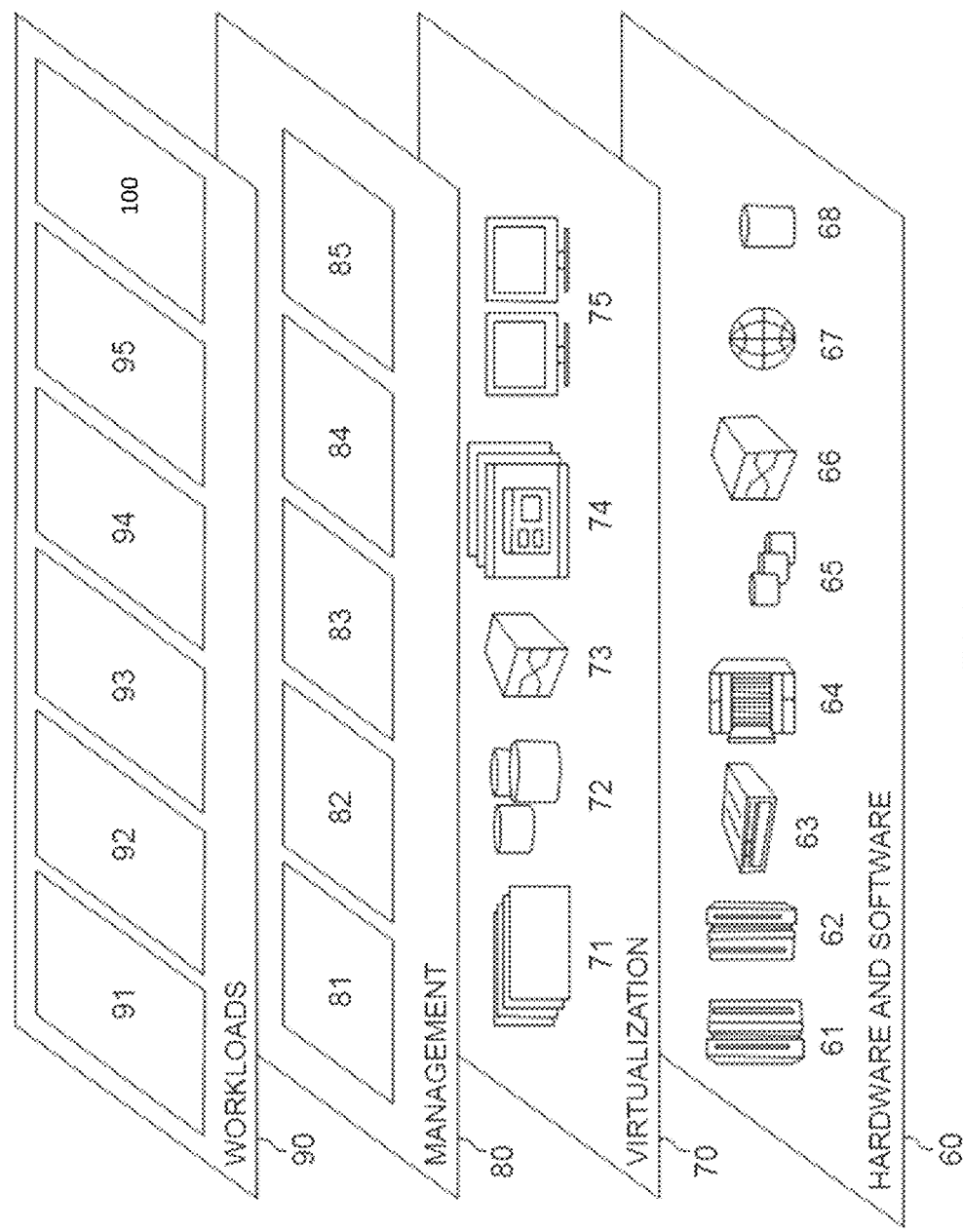
FIG. 7 depicts abstraction model layers according to an embodiment of the present invention.

Referring now to FIG. 7, an exemplary set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the robot control method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented robot control method, the method comprising:
   extracting robot data from a robot and user emotional state data of a user interacting with the robot;
   configuring a mission of a robot comprising a sequence of a plurality of tasks based on the robot data and the user emotional state data; and
   reconfiguring an order of the sequence of the plurality of tasks to create a new sequence of the plurality of tasks if a change in the user emotional state data is detected,
   wherein the new sequence of the plurality of tasks is configured to increase an emotional satisfaction level of the user towards the robot.

2. The computer-implemented method of claim 1, wherein the reconfiguring reconfigures the order of the sequence of the plurality of tasks if a change in the robot data is detected.

3. The computer-implemented method of claim 1, wherein the new sequence of the plurality of tasks is configured to maximize an emotional satisfaction level of the user towards the robot.

4. The computer-implemented method of claim 1, further comprising generating an explanation of a reason for performing a task in the sequence of the plurality of tasks if the user confronts the robot about a rationale for performing the task.

5. The computer-implemented method of claim 4, wherein the explanation is generated to maximize an objective function factoring the user emotional state data, the robot data, the mission, and the sequence of the plurality of tasks.

6. The computer-implemented method of claim 4, wherein the generating the explanation computes and scores a plurality of explanations based on the robot data, the user emotional state data, and past explanations from a database, and
   wherein the generating outputs to the user the explanation having a highest score.

7. The computer-implemented method of claim 6, wherein the generating adjusts a score of each of the plurality of explanations based on a user feedback of the output explanation.

8. The computer-implemented method of claim 4, wherein the reconfiguring the order of the sequence of the plurality of tasks is overridden if a cost associated with the new sequence is greater than a predetermined threshold, and
   wherein the generating generates the explanation for the user to explain a reason for overriding the new sequence when the change in the user emotional state data is detected.

9. The computer-implemented method of claim 1, wherein the robot data comprises:
   a current power level;
   a mapping of an environment of the robot;
   a current location,
   a position of the user relative to the robot;
   historical data about previous tasks performed by the robot; and
   environment conditions.

10. The computer-implemented method of claim 1, wherein the user emotional state data is extracted from one of:
    an audio-visual stream;
    user data;
    a historical profile of the user input to the robot; and
    social media data.

11. The computer-implemented method of claim 1, embodied in a cloud-computing environment.

12. A computer program product for robot control, the computer program product comprising a computer-readable storage medium having program instructions embodied therewith, the program instructions executable by a computer to cause the computer to perform:
    extracting robot data from a robot and user emotional state data of a user interacting with the robot;
    configuring a mission of a robot comprising a sequence of a plurality of tasks based on the robot data and the user emotional state data; and
    reconfiguring an order of the sequence of the plurality of tasks if a change in the user emotional state data is detected,
    wherein the new sequence of the plurality of tasks is configured to increase an emotional satisfaction level of the user towards the robot.

13. The computer program product of claim 12, wherein the reconfiguring reconfigures the order of the sequence of the plurality of tasks if a change in the robot data is detected.

14. The computer program product of claim 12, wherein the new sequence of the plurality of tasks is configured to maximize an emotional satisfaction level of the user towards the robot.

15. The computer program product of claim 12, further comprising generating an explanation of a reason for performing a task in the sequence of the plurality of tasks if the user confronts the robot about a rationale for performing the task.

16. The computer program product of claim 15, wherein the explanation is generated to maximize an objective function factoring the user emotional state data, the robot data, the mission, and the sequence of the plurality of tasks.

17. The computer program product of claim 15, wherein the generating the explanation computes and scores a plurality of explanations based on the robot data, the user emotional state data, and past explanations from a database, and
    wherein the generating outputs to the user the explanation having a highest score.

18. The computer program product of claim 17, wherein the generating adjusts a score of each of the plurality of explanations based on a user feedback of the output explanation.

19. A robot control system, said system comprising:
    a processor; and
    a memory, the memory storing instructions to cause the processor to perform:
       extracting robot data from a robot and user emotional state data of a user interacting with the robot;
       configuring a mission of a robot comprising a sequence of a plurality of tasks based on the robot data and the user emotional state data; and
       reconfiguring; an order of the sequence of the plurality of tasks if a change in the user emotional state data is detected,
    wherein the new sequence of the plurality of task is configured to increase an emotional satisfaction level of the user towards the robot.

20. The system of claim 19, embodied in a cloud-computing environment.

* * * * *